US008374256B2

(12) United States Patent
Kodama et al.

(10) Patent No.: US 8,374,256 B2
(45) Date of Patent: *Feb. 12, 2013

(54) COMMUNICATION APPARATUS AND COMMUNICATION METHOD

(75) Inventors: Nobutaka Kodama, Fukuoka (JP); Hisao Koga, Chikushi-gun (JP); Yuji Igata, Chikushino (JP); Shinichiro Ohmi, Yonono-gun (JP); Go Kuroda, Izumisano (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/437,457

(22) Filed: May 7, 2009

(65) Prior Publication Data
US 2009/0238288 A1 Sep. 24, 2009

Related U.S. Application Data

(62) Division of application No. 11/745,364, filed on May 7, 2007, now Pat. No. 7,542,512.

(51) Int. Cl.
*H04L 27/00* (2006.01)
(52) U.S. Cl. ........ 375/259; 375/257; 375/258; 375/260; 375/340; 375/342; 375/354; 375/356; 370/324; 370/329; 370/343; 370/344; 370/350; 370/431; 370/445; 370/503; 455/450; 455/502; 341/173; 341/180; 714/707; 327/141
(58) Field of Classification Search .................. 375/257, 375/258, 329, 359, 259, 260, 340, 342, 354, 375/356; 370/282, 465, 324, 329, 343, 344, 370/350, 431, 445, 503; 455/450, 502; 341/173, 341/180; 714/707; 327/141
See application file for complete search history.

(56) References Cited

U.S. PATENT DOCUMENTS

| 3,897,887 | A | 8/1975 | Goldberg |
| 5,694,436 | A | 12/1997 | Huang et al. |
| 6,477,171 | B1 | 11/2002 | Wakeley et al. |
| 7,242,729 | B1 | 7/2007 | Heistermann |
| 7,286,494 | B2 | 10/2007 | Kaku |
| 7,346,021 | B2 * | 3/2008 | Yoshizawa et al. ........... 370/322 |
| 2003/0156014 | A1 | 8/2003 | Kodama et al. |
| 2005/0169363 | A1 | 8/2005 | Longvinov et al. |
| 2005/0190785 | A1 | 9/2005 | Yonge |

FOREIGN PATENT DOCUMENTS

| EP | 1 331 765 | 7/2003 |
| EP | 1331765 | 7/2003 |
| JP | 62294339 | 12/1987 |
| JP | 01-136430 | 5/1989 |
| JP | 11-266190 | 9/1999 |

(Continued)

OTHER PUBLICATIONS

Korean Office Action dated Feb. 24, 2010, in the corresponding Korean patent application, with English translation.

(Continued)

*Primary Examiner* — Leon Flores
(74) *Attorney, Agent, or Firm* — Dickinson Wright PLLC

(57) ABSTRACT

A communication system includes a synchronizing signal generator that generates a synchronizing signal based on a timing of an alternating waveform in a power line, a data communicating circuit that performs the data communication, and a communication controller that controls to acquire a transmitting right utilizing a timing of the synchronizing signal and to control the communication circuit in accordance with whether or not the communication apparatus acquires the transmitting right.

24 Claims, 17 Drawing Sheets

FOREIGN PATENT DOCUMENTS

| | | |
|---|---|---|
| JP | 2000165304 | 6/2000 |
| JP | 2002-111553 | 4/2002 |
| JP | 2002-314466 | 10/2002 |
| JP | 2003218831 | 7/2003 |
| JP | 2004-007490 | 1/2004 |
| JP | 2005253076 | 9/2005 |
| WO | 2004/038980 | 5/2004 |
| WO | 2004/095165 | 11/2004 |

OTHER PUBLICATIONS

Japanese Office Action dated Jul. 6, 2010, with Partial English Translation.

European Search Report dated Aug. 27, 2010.

M. K. Lee, et al., "HomePlug 1.0 Powerline Communication LANs—Protocol Description and Performance Results version 5.4," International Journal of Communication Systems, Jan. 2000, pp. 1-25.

* cited by examiner

COMMUNICATION APPARATUS AND COMMUNICATION METHOD

This is a divisional application of application Ser. No. 11/745,364 filed on May 7, 2007 (pending) which is a continuation of Ser. No. 11/319,200 filed on Dec. 28, 2005, which is based on and claims priority of Japanese Application No. 2005-000163 filed on Jan. 4, 2005, the entire contents of each of which are expressly incorporated by reference herein.

BACKGROUND OF THE INVENTION

1. Field of the Invention

The present invention generally relates to power line communication (PLC) systems and methods for data communications over a power distribution system, and more particularly, to a device for facilitating communications through power lines and a method of using the same.

2. Related Art

In general, when a terminal (for example, a computer terminal) performs wired data communication in a home, office or factory environment, a great deal of preparatory engineering work must be performed before a communication system including the terminal is able to begin operations. This is because the communication system needs to install connectors and cables as transmission lines to appropriate positions.

However, with respect to power line communications, the preparatory engineering work in such environments is reduced in comparison with other communication technologies, because almost all of such environments already have in place many commercial power supply lines located in virtually every nook and cranny, while using a commercial power supply, for example, alternating current 100V (50 Hz/60 Hz) in Japan or 120V in the U.S. More particularly, in the case of PLC, it will be possible to establish a data communication line by just connecting a communication apparatus plug to an outlet of the commercial power supply.

JP2000-165304A describes an example of PLC technology utilizing a power line as a data communication line.

In Japan, the frequency band from 2 MHz to 30 MHz is planned to be opened to PLC. At present, many companies are in the process of research and development of PLC technology. However, at this time, there is no PLC standard in Japan, and each company has different specifications for PLC communications relating to protocol, modulating method, and frequency band.

In view of the above, there is high possibility, during actual use, of mixing different PLC communication methods in a same environment. For example, assuming that people who live in an apartment or condominium complex use PLC apparatuses therein, they may use different communication apparatuses made by different manufacturers. In such situation, these different communication apparatuses may be simultaneously connected to a common power line.

In such situation, each communication apparatus may not demodulate signals from the other apparatuses that use different types of PLC communication methods, and may recognize these signals as noise. Because each apparatus may not recognize the existence of the others on the common power line, signals output from different communication apparatuses may collide with each other. Under these conditions, it may become almost impossible to effect a communication. That is, it may become almost impossible for these different PLC apparatuses to coexist on a common power line. In order to facilitate such coexistence, these different apparatuses would need to undergo significant changes to their circuits and controllers.

On the other hand, a plurality of the same kind of PLC apparatuses are able to communicate with each other using a common power line because the signal multiplexing is performed based on time division multiplexing.

SUMMARY

Some embodiment examples described herein address the above-mentioned problem.

According to an embodiment example, the communication apparatus according to the invention comprises a synchronizing signal generator that generates a synchronizing signal based on a timing of an alternating waveform in a power line, a data communicating circuit that performs the data communication, and a communication controller that controls to acquire a transmitting right utilizing a timing of the synchronizing signal and to control the communication circuit in accordance with whether or not the communication apparatus acquires the transmitting right.

DETAILED DESCRIPTION OF VARIOUS EMBODIMENT EXAMPLES

Several embodiment examples will be described below with reference to FIGS. 1 and 17.

Figure 1:
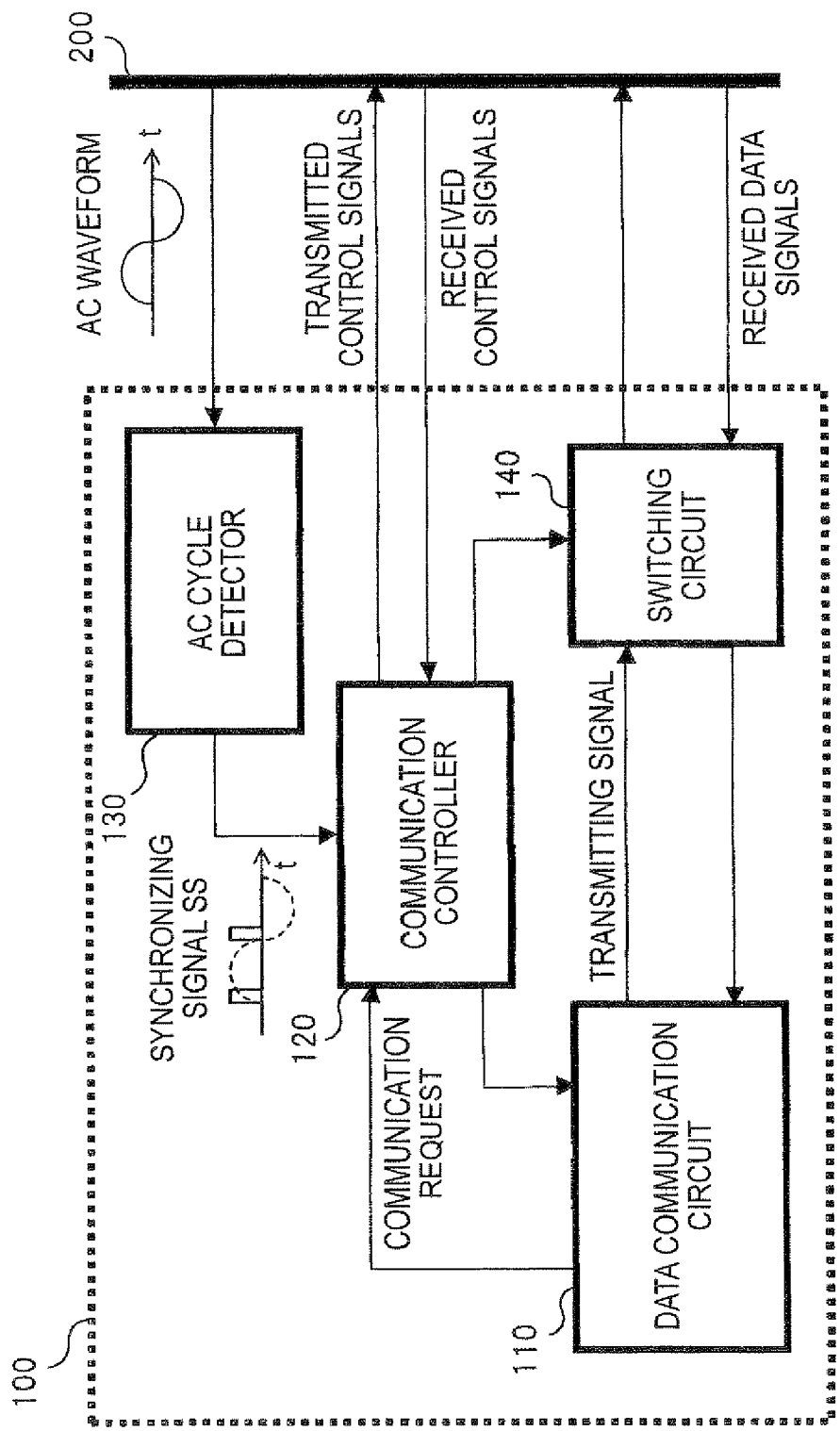
FIG. 1 is a block diagram illustrating a communication apparatus.

As shown in FIG. 1, a communication apparatus 100 is electrically connected to a transmission line 200. In this embodiment example, the communication apparatus operates as a modem, and communicates with a communication terminal (not shown) such as a computer. In particular, the communication apparatus 100 may be a personal computer, a home information appliance, an Internet appliance, or a digital network appliance, or other such devices.

A power line installed in a home, an office or a factory, for example, rubber-insulated cable, is used as transmission line 200. The power line supplies electricity of a commercial power supply, for example, Alternating Current 100V (50 Hz/60 Hz) in Japan, to each electric apparatuses. The power line may be able to utilize unused frequency band for data communication.

In addition, the commercial power supply is not required to be alternating current 100V (50 Hz/60 Hz) but each country has an original standard such as alternating current 120V (60 Hz) in the U.S. and alternating current 110/220V (50 Hz) in China.

Figure 16:
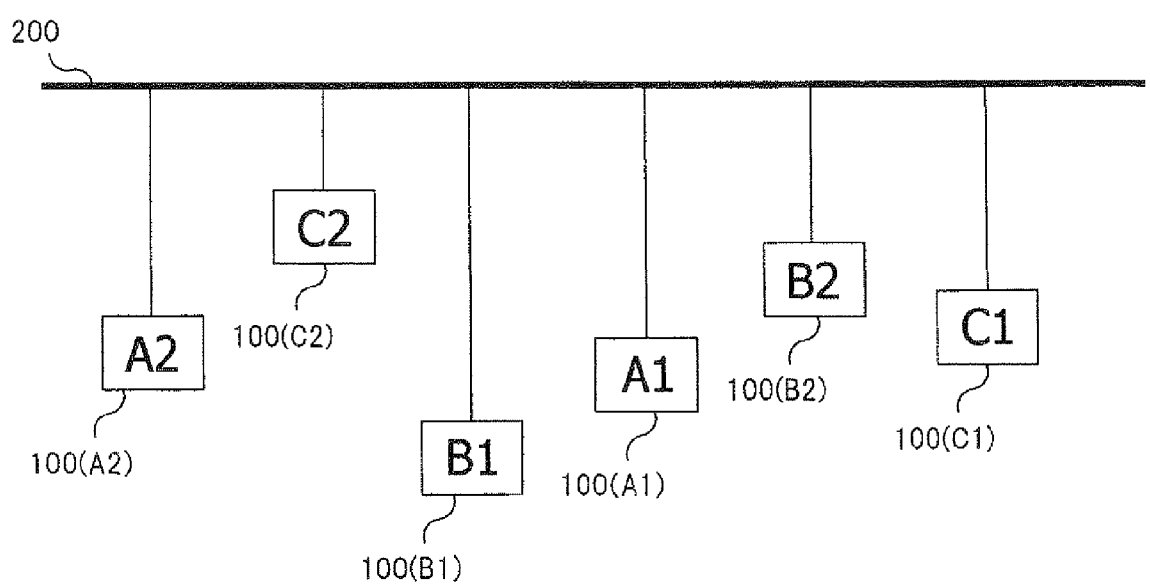
FIG. 16 is a block diagram illustrating an example of a system connected a plurality of communication apparatuses to a common transmission line.

Furthermore, when a communication apparatus 100 is installed in an apartment or a condominium complex, as shown in FIG. 16, many communication apparatuses 100 connect to the transmission line 200. Referring to FIG. 16, for example, a plurality of the communication apparatuses 100A1, 100A2, 100B1, 100B2, 100C1, and 100C2 connect to the power line 200. A pair of the communication apparatuses 100A1 and 100A2, a pair of the communication apparatuses 100B1 and 100B2, and a pair of the communication apparatuses 100C1 and 100C2 use communication method "A", communication method "B", and communication method "C", respectively. Therefore, each of the communication apparatuses 100A1 and 100A2 is the same type of the communication apparatus 100A. Each of the communication apparatuses 100B1 and 100B2 is the same type of the apparatus 100B. Each of the communication apparatuses 100C1 and 100C2 is the same type of the apparatus 100C.

However, the communication types A, B and C among the communication apparatuses 100A, 100B, and 100C are different from each other. The difference/differences among those three types of communication apparatuses 100A, 100B, and 100C is/are at least one of communication protocol, modulation method of data signal, symbol rate of the data signals, and so on.

Figure 17:
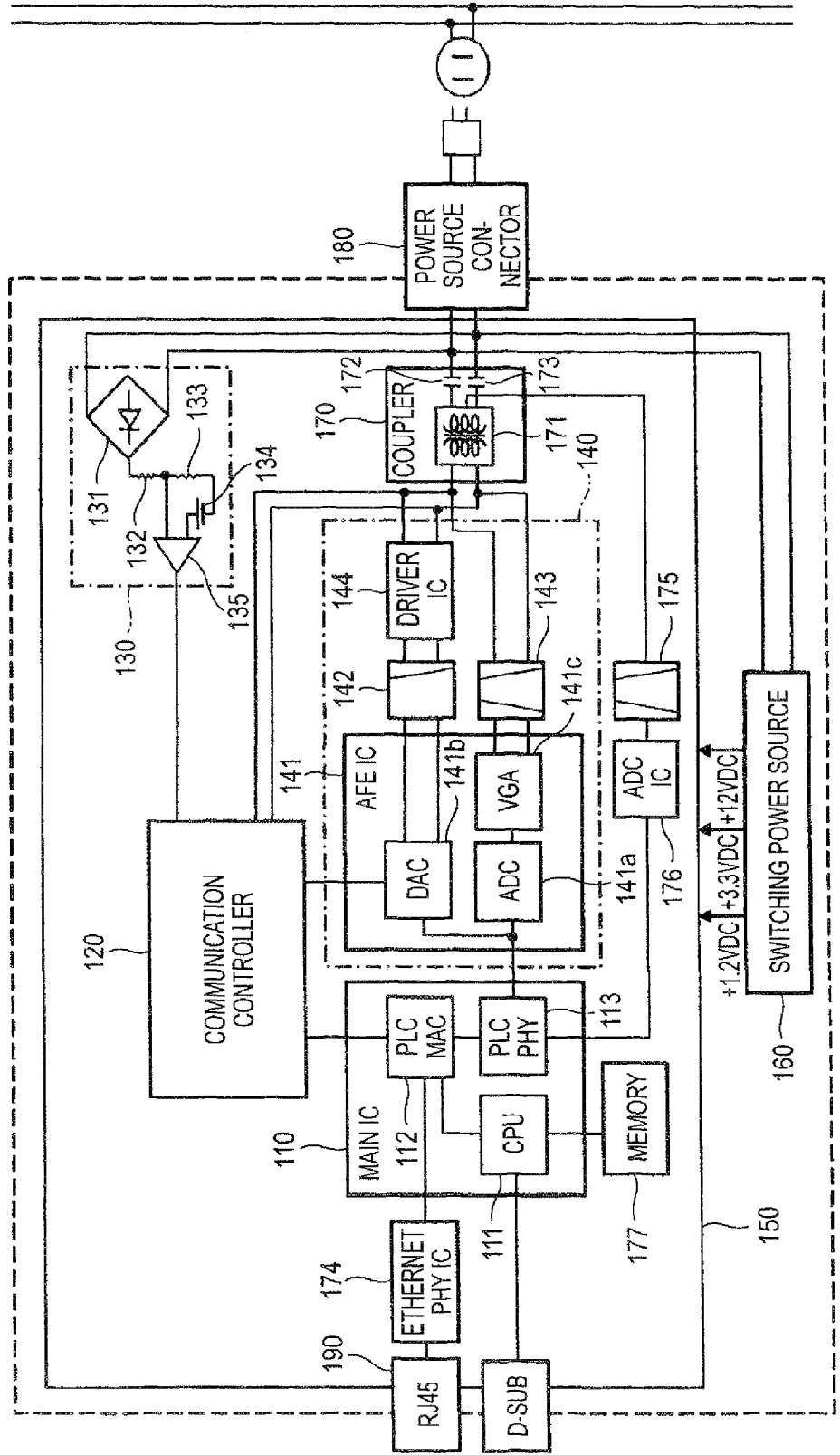
FIG. 17 is a circuit block diagram illustrating a communication apparatus shown in FIG. 1.

Referring to FIGS. 1 and 17, a technology will be described, which allows a plurality types of communication apparatuses to coexist on a common transmission line 200. Hereinafter, it is assumed that there are three communication apparatus 100A, 100B and 100C on the transmission line 200. Each of the communication apparatuses 100A, 100B, and 100C may have a data communication circuit 110, a communication controller 120, an AC cycle detector 130, and a switching circuit 140 in common.

For illustrative purposes, hereinafter, a structure of the communication apparatus 100A will be described in detail.

Communication apparatus 100A further comprises a circuit module 150 and a switching power source 160. The switching power source 160 supplies several kinds of power voltages, for example +1.2V, +3.3V and +12V, to the circuit module 150. The circuit module 150 comprises a coupler 170, a band pass filter 171, an ADC IC 176, a memory 177 and an Ethernet PHY (Physical layer) IC 174 in addition to the data communication circuit 110, the communication controller 120, the AC cycle detector 130 and the switching circuit 140

The data communication circuit 110 is an electric/electronic circuit that performs signal processing including general control and modulation/demodulation for the data communication as a typical modem. The data communication circuit 110 modulates a data signal or data signals (hereinafter data signals) outputted from a terminal such as a personal computer (not shown) to provide modulated signals, and outputs the modulated signals as transmitted data signals. Furthermore, the data communication circuit 110 demodulates data signals inputted through the transmission line 200 to provide demodulated signals, outputs the demodulated signals as received data signals to a communication terminal such as a personal computer. In addition, the data communication circuit 110 outputs predetermined communication request signals in advance of the data communication in order to confirm the condition of the transmission line 200 including whether or not the transmission line 200 is ready for the data communication.

The data communication circuit 110 comprises a main IC which comprises a CPU (central processing unit) 111, a PLC/MAC block (power line communication/media access control layer block) 112 and a PLC/PHY block (power line communication/physical layer block) 113. The CPU 111 comprises a 32 bits RISC (reduced instruction set computer) processor. The PLC/MAC block 112 manages MAC layer of received and transmitted signals. The PLC/PHY block 113 manages PHY layer of the received and transmitted signals.

The switching circuit 140 is located between the data communication circuit 110 and the transmission line 200, and has a plurality of switches, which control to pass the transmitted data signals and the received data signals. In other words, the plurality of switches control to switch the data communication function. The switching circuit 140 comprises analog front end (AFE) IC 141, a low pass filter 142, a band pass filter 143 and a driver IC 144. The AFE IC 141 comprises many devices such as an analog/digital (A/D) converter 141a, a D/A converter 141b, filters and a VGA (variable gain amplifier) 141c, and is an interface between the data communication circuit 110 and the transmission line 200. The switching circuit 140 controls to pass the transmitted data signals and/or the received data signals by switching these elements in the AFE IC 141.

Furthermore, the switching circuit 140 may comprise a switch, which can be controlled to switch by an external control signal, like an analog switch. In that case, the AFE mentioned before may be incorporated in the data communication circuit 110. It will be recognized by those skilled in the art that many alternative kinds of switches can be used as the switching circuit 140 if the switches can switch the data communication function.

The AC cycle detector 130 produces synchronizing signals, which is used such that a plurality types of the communication apparatuses 100A, 100B, and 100C control in a common timing. The AC cycle detector 130 comprises a diode bridge 131, registers 132 and 133, a DC (direct-current) power supply 134 and a comparator 135. The diode bridge 131 connects to the register 132. The register 132 connects to the register 133 in series. Both the registers 132 and 133 connect to a terminal of the comparator 135 in parallel. The DC power supply 134 connects to another terminal of the comparator 135. Practically, as shown in FIG. 1, the AC cycle detector 130 detects points at the intersection of X-axis with the 50 Hz or 60 Hz AC voltage sine-waveform (AC) of the commercial power source supplied to the transmission line 200 (zero crossing points), produces synchronizing signals (SS) with reference to the zero crossing points, and outputs the SS. Each SS may be, for example, a rectangular wave including a plurality of pulses synchronizing to the zero crossing point. Therefore, the SS may start from the zero crossing point or may have a certain offset from the zero crossing point.

The communication controller 120 performs a control necessary to coexist with the other communication apparatuses 100B and 100C, synchronizing to the timing of the SS outputted from the AC cycle detector 130. That is to say, the communication controller 120 controls to acquire a right that the communication apparatus 100 uses the transmission line 200 in accordance with communication request signals outputted from the data communication circuit 110. Furthermore, the communication controller 120 outputs control signals as transmitted control signals to the transmission line 200 in order to negotiate with other communication apparatuses 100B and 100C with the right to use the transmission line 200 (hereinafter, the "transmitting right"), and receives control signals via the transmission line 200 as received control signals. In addition, the controller controls the switching circuit 140 in accordance with whether or not the communication apparatus 100A acquires the transmitting right, in other words, whether or not it is a time period when the communication apparatus 100A can use the frequency band of the transmission line 200.

The communication controller 120 controls to switch the switching circuit 140 during the time period when the communication apparatus 100 can not use the frequency band on the transmission line 200. During this time, therefore, the data communication circuit 110 disconnects to the transmission line 200. This configuration makes it possible to prevent a plurality of different type signals outputted from a plurality of different types communication apparatuses from colliding with each other on the transmission line 200 because, during this time, only the communication apparatus 100A can exclusively use the frequency band of the transmission line 200. Therefore, each manufacturer can select an appropriate communication protocol, an appropriate modulation method, an appropriate symbol rate, and so on in accordance with its design concept without considering the collision with the other communication apparatuses connected to the transmission line. Further, its existing communication circuit can be used as the data communication circuit 110 without making a significant change. Moreover, at least two of these functions of the data communication circuit 110, the communication controller 120, the AC cycle detector 130, and the switching circuit may be integrated into an integrated circuit.

The coupler 170 comprises a coil-type transformer 171, and coupling condensers 172 and 173. The power source connector 180 connects to the AC cycle detector 130, the coupler 170 and the switching power source 160. The coupler 170 connects to the communication controller 120 and the switching circuit 140. The switching circuit 140 connects to the data communication circuit 110 and RJ45 plug-in phone jack 190 via the Ethernet PHY IC 174.

Figure 2:
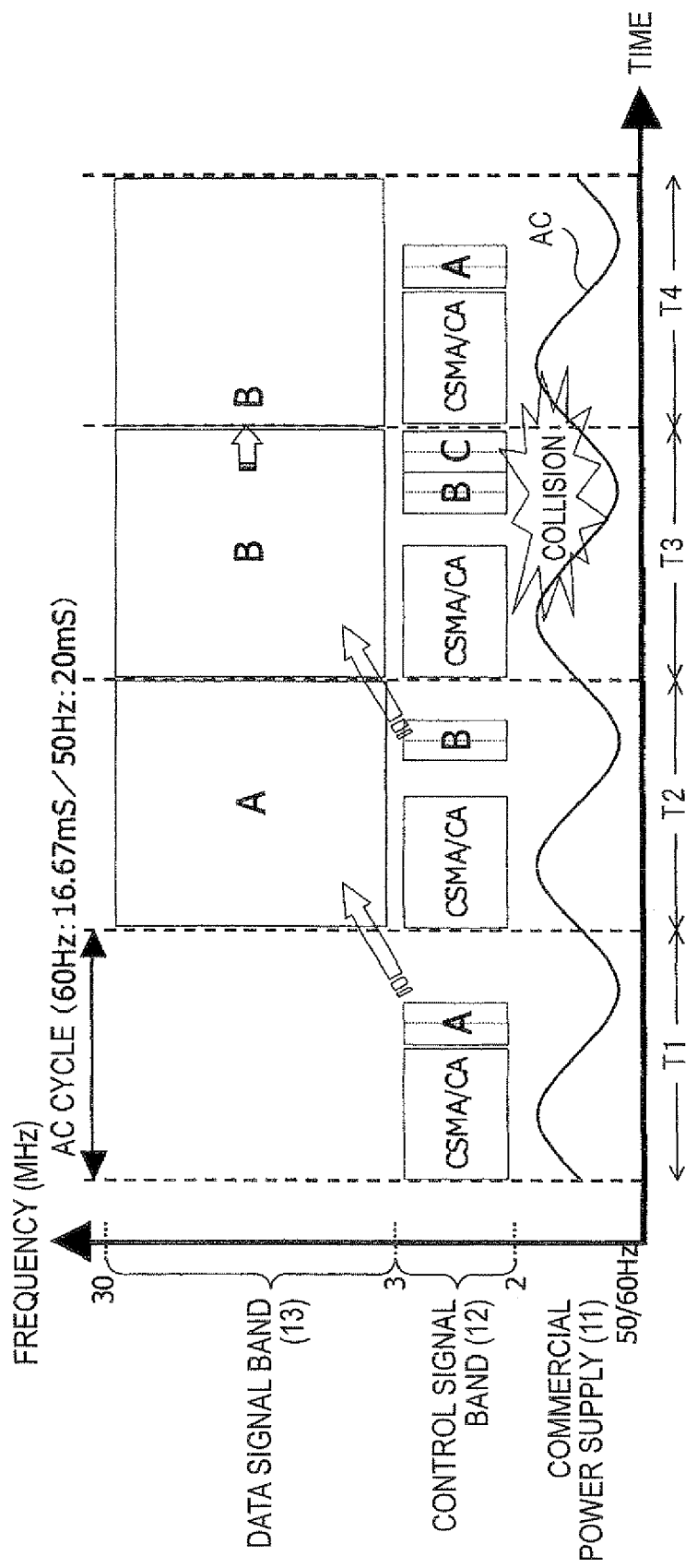
FIG. 2 is a timing chart illustrating an example of an operation of a plurality of communication apparatuses.

As shown in FIG. 2, in this embodiment example, the frequency band on the transmission line 200 is divided into a plurality of bands such as a commercial power source band 11, a control signal band 12, and data signal band 13. For example, the frequency band assigned to the commercial power band is from 50 Hz to 2 MHz, the frequency band assigned to the control signal band is from 2 MHz to 3 MHz, and the frequency band assigned to the data signal band is from 3 MHz to 30 MHz.

The control signal band 12 is exclusively used for the negotiation to acquire the transmitting right. In other words, the control signals for the negotiation are transmitted and received via the control signal band 12. The transmitted control signal and the received control signal shown in FIG. 1 are assigned to the control signal band 12.

The data signal band 13 is exclusively used for the actual data communication signals. Various data signals are transmitted and received through the data signal band 13. The transmitted signal (data) and the received signal (data) shown in FIG. 1 are assigned to the data signal band 13.

Figure 3:
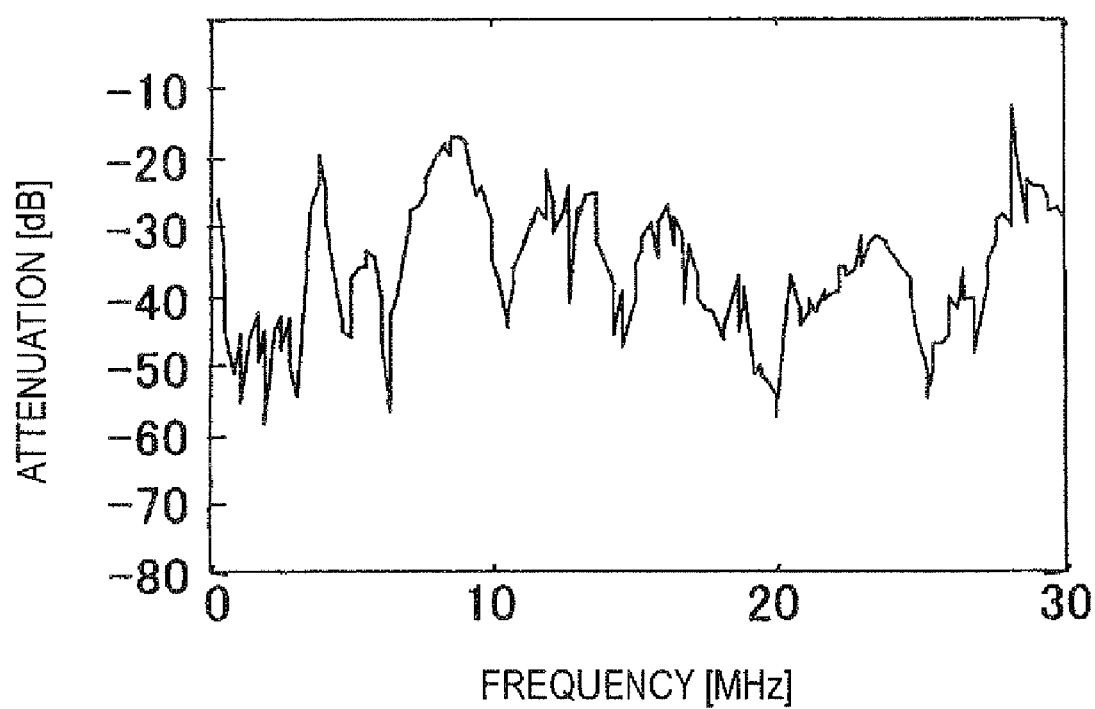
FIG. 3 is a graph illustrating an example of a frequency characteristic of a transmission line using a power line.
Figure 4:
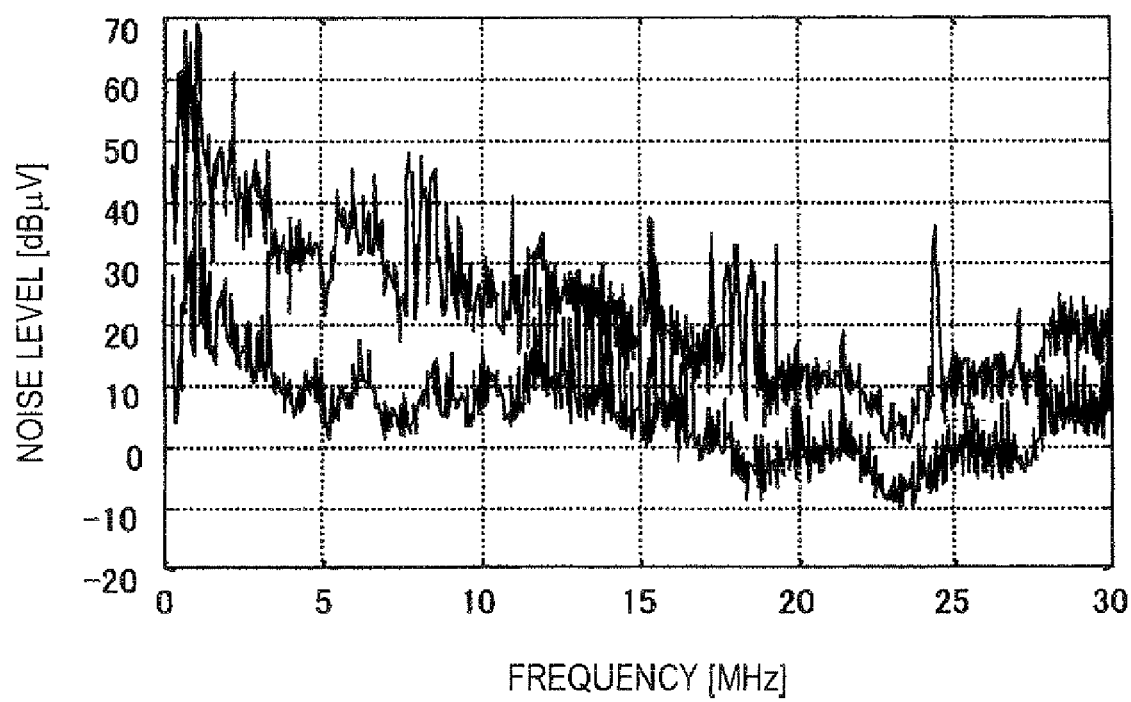
FIG. 4 is a graph illustrating an example of a noise frequency characteristic of a wall outlet.

As shown in FIGS. 3 and 4, signals transmitted in the frequency band from 2 MHz to 3 MHz tend to attenuate greater than signals transmitted in the other frequency band, and tend to have more noise than signals transmitted in the other frequency band. Although it is desirable to use frequency band as broad as possible in order to perform fast transmission, this frequency band (2-3 MHz) does not contribute much to the fast transmission because the signal-to-noise ratio (S/N) of this frequency band is relatively low. Therefore, assigning this frequency band to the control signal band 12 makes it possible to inhibit the transmission speed through the transmission line 200 from lowering.

Figure 5:
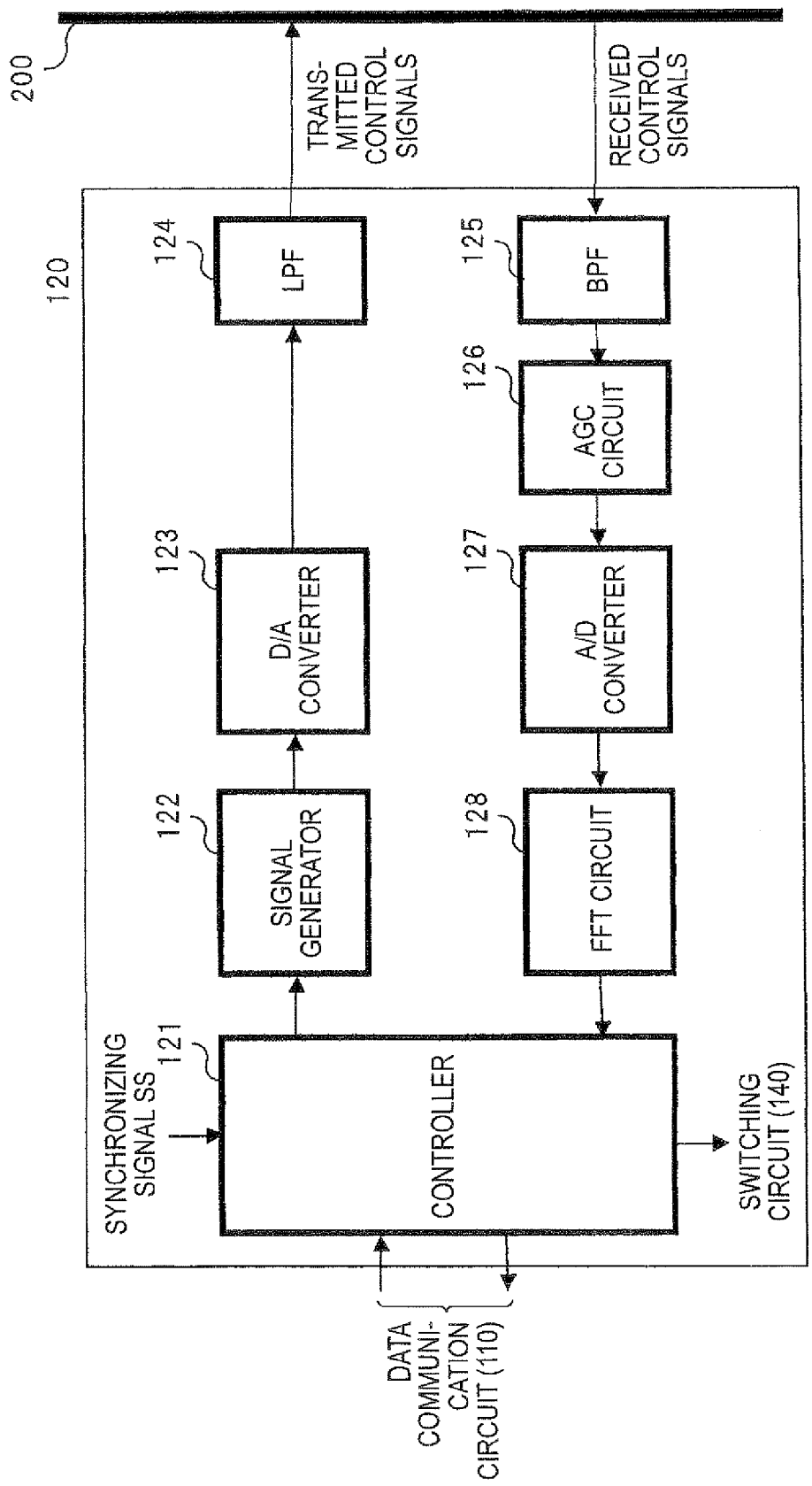
FIG. 5 is a block diagram illustrating an example of a communication controller.

As shown in FIG. 5, the communication controller 120 comprises a controller 121, signal generator 122, a D/A converter 123, a low pass filter (LPF) 124, a band pass filter (BPF) 125, an AGC circuit 126, an A/D converter 127, and a fast Fourier transform (FFT) circuit 128.

The controller 121 is a digital circuit, which controls the entire communication apparatus 100A in accordance with the communication request signal, synchronizing the timing of the synchronizing signals inputted from the AC cycle detector 130.

Figure 6:
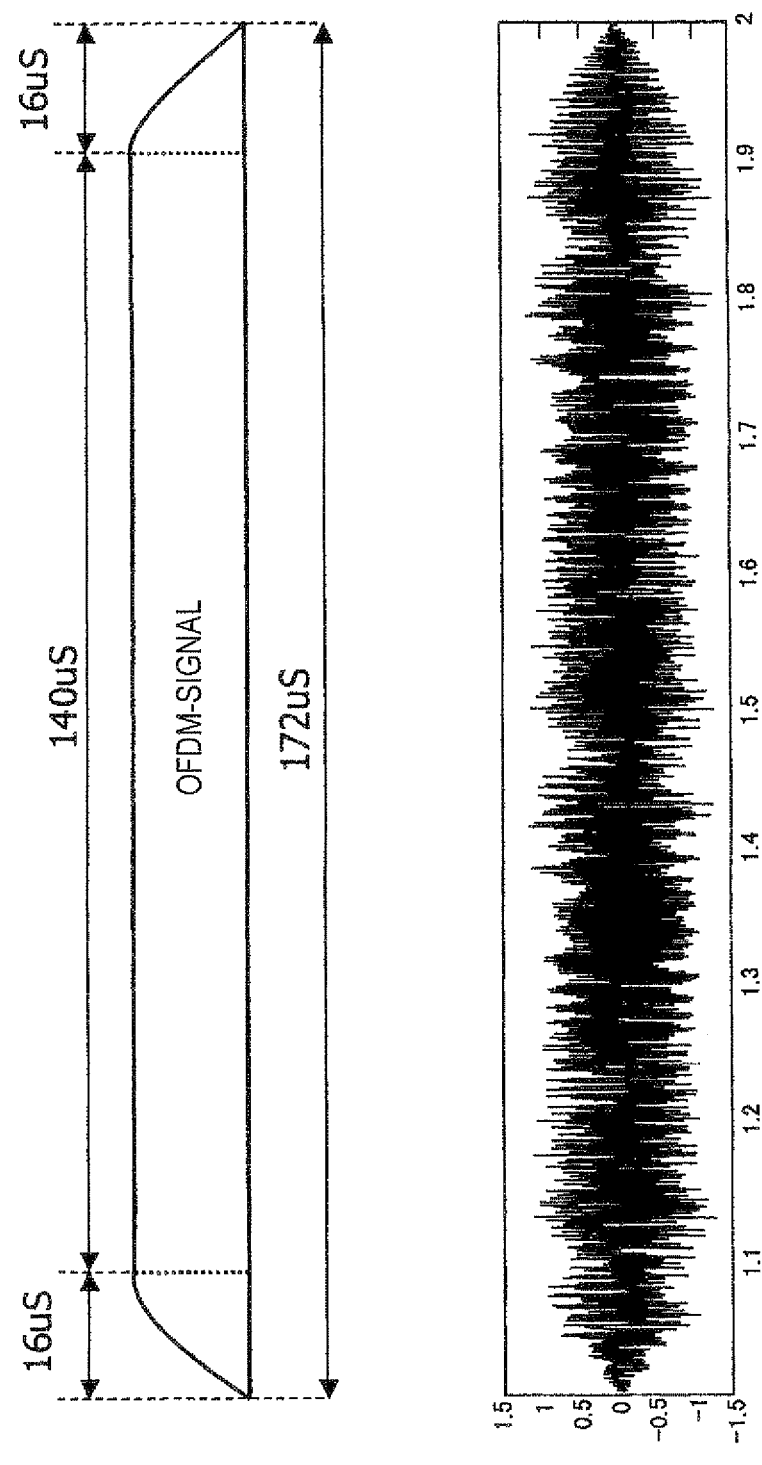
FIG. 6 is a wave-shape diagram illustrating an example of a signal format outputted from a communication controller.
Figure 7:
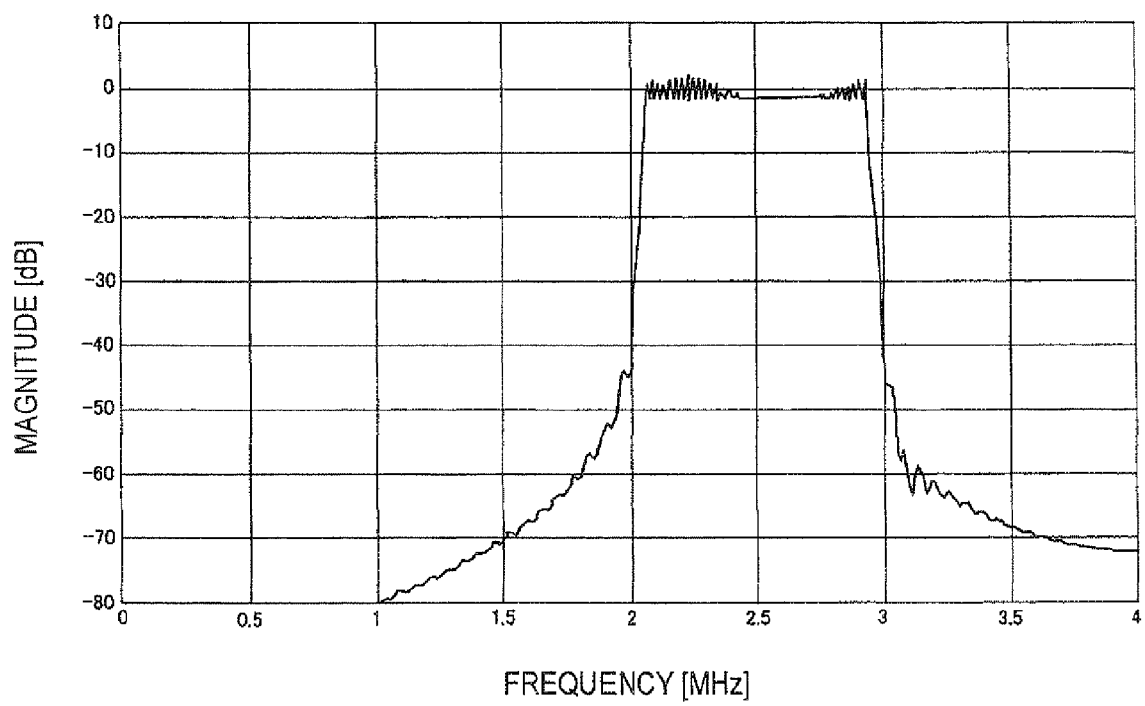
FIG. 7 is a diagram illustrating an example of a signal spectrum of control signals outputted from a communication controller.

The signal generator 122 generates a waveform pattern of the control signal necessary to perform negotiation with the other communication apparatuses 100B and/or 100C connected to the transmission line 200 in accordance with an instruction of the controller 121. This control signal is a multi-carrier signal such as orthogonal frequency division multiplexing (OFDM) and spread spectrum. Practically, the control signal utilizing OFDM, which has a signal spectrum as shown in FIG. 7, is produced as shown in FIG. 6.

The D/A converter 123 converts digital OFDM signals outputted from the signal generator 122 into analog signals.

The LPF 124 allow the analog signals with the frequency of the control signal band 12 to pass therethrough, and prevent the analog signal with the other frequency from passing therethrough. Again, the frequency band of the control signal band 12 is 2-3 MHz. In addition, the LPF 124 can be replaced with a band pass filter.

The BPF 125 allows analog signals with the frequency of the control signal band 12, which are inputted from the transmission line 200, to pass therethrough, and output the passed analog signals to the AGC circuit 126.

The AGC circuit 126 automatically controls gain of passed analog signals, and amplifies the analog signals such that the passed analog signals from the BPF 125 can keep a specified level if the passed analog signal attenuates.

The A/D converter 127 converts the analog signals inputted from the AGC circuit 126 into digital signals.

The FFT circuit 128 performs predetermined FFT to the digital signals inputted from the A/D converter 127, converts multi-carrier signals emerging in time domain into signals in frequency domain. Here, the FFT circuit performs FFT at 128 points. The number of the points is not limited to 128.

The controller 121 examines the signals outputted from the FFT circuit 128, and confirms whether or not a carrier relevant to a signal sent by the communication apparatus 100B or 100C as a OFDM control signal (coexistence signal) exists in the signals outputted from the FFT circuit 128.

Next, several controls performed by the communication controller 120, which are necessary to a plurality types of the communication apparatuses 100A, 100B, and 100C so as to coexist on the common transmission line 200, will be described.

As the AC waveform of the commercial power source on the transmission line 200 is used as a common signal in a plurality of the communication apparatuses 100A, 100B, and 100C, each switching circuit 140 of the communication apparatuses 100A, 100B, and 100C is controlled with synchronizing to the AC waveform, in other words, with synchronizing to the synchronizing signals outputted from the AC cycle detector 130. Specifically, as shown in FIG. 2, one cycle (60 Hz:16.67 milisec/50 Hz:20 milisec) of the AC waveform sets as control cycle, and the communication apparatuses 100A, 100B, and 100C are repeatedly controlled every one control cycle.

Specifically, the control in control cycles T2, T3, and T4 for acquiring the transmitting right for the data signal frequency band 13 are performed in control cycles T1, T2, and T3 of the control frequency band 12, respectively.

Figure 8:
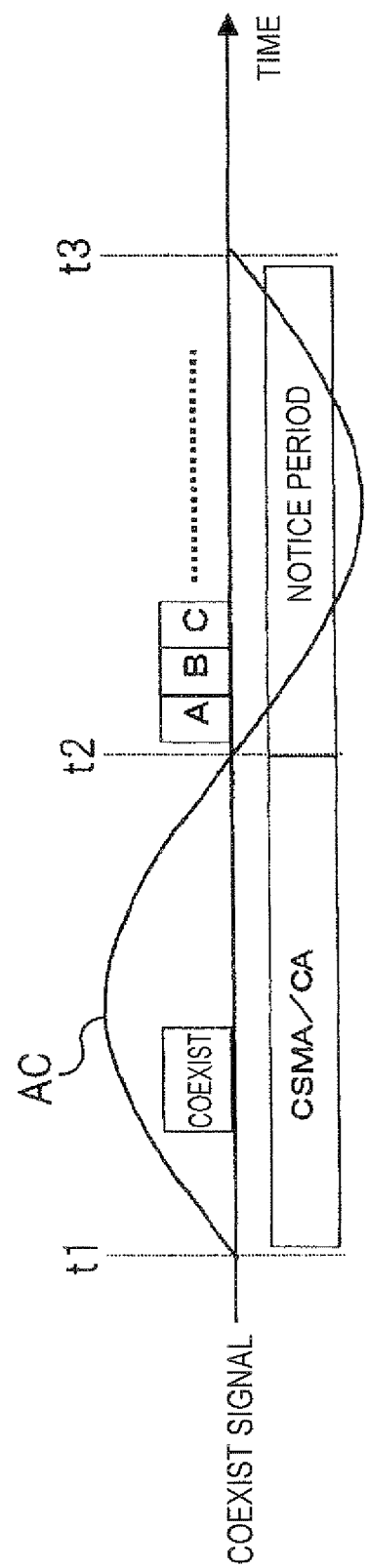
FIG. 8 is a timing chart illustrating an example of an operation of a plurality of communication apparatuses.

As shown in FIG. 8, each of control cycles T1, T2, and T3 is divided into two periods, specifically, a first half period of the control cycle in the AC voltage waveform (the period from t1 to t2) and a second half of the control cycle in the AC voltage waveform (the period from t2 to t3). The first half period is used for detecting a carrier. Here, the first half period is set as a period for performing carrier sense multiple access with collision avoidance (CSMA/CA), in other words, a period for carrier detection. The second half period is set as a period for notice of using, in other words, a notice period. That is, with synchronizing to the SS, the CSMA/CA period and the notice period is set.

In the CSMA/CA period, each of communication apparatuses 100A, 100B, and 100C performs CSMA/CA on the basis of a predetermined back-off-rule. In other words, one of communication apparatuses 100A, 100B, and 100C sends the coexist signal transmitted to the control signal frequency band 12 after the one of the communication apparatuses 100A, 100B, and 100C confirms whether the transmission line 200 is not used for a predetermined consecutive time or more by any of the other communication apparatuses 100A, 100B, and 100C. The predetermined consecutive time is a combination of the "waiting time" and the "minimum time." For example, the minimum time is at least more than one symbol length. If the one symbol length is 100 μsec, the minimum time may be more than 100 μsec, for example, 200 μsec. In this case, the random waiting time is around several tens to hundreds of μsec. Basically, the one of the communication apparatuses 100A, 100B, and 100C that successfully transmits the coexist signal in the CSMA/CA period acquires the transmitting right to exclusively use the data signal frequency band 13 of the transmission line 200.

Furthermore, any of several alternative kinds of signals may be used as the coexist signal provided these signals can discriminate carrier existence in the control signal frequency band 12. Here, OFDM signals are used as the coexist signal. Multi-tone signals, which have 100 μs symbol length and 56 waves therein, may be used as actual OFDM signals.

Figure 9:
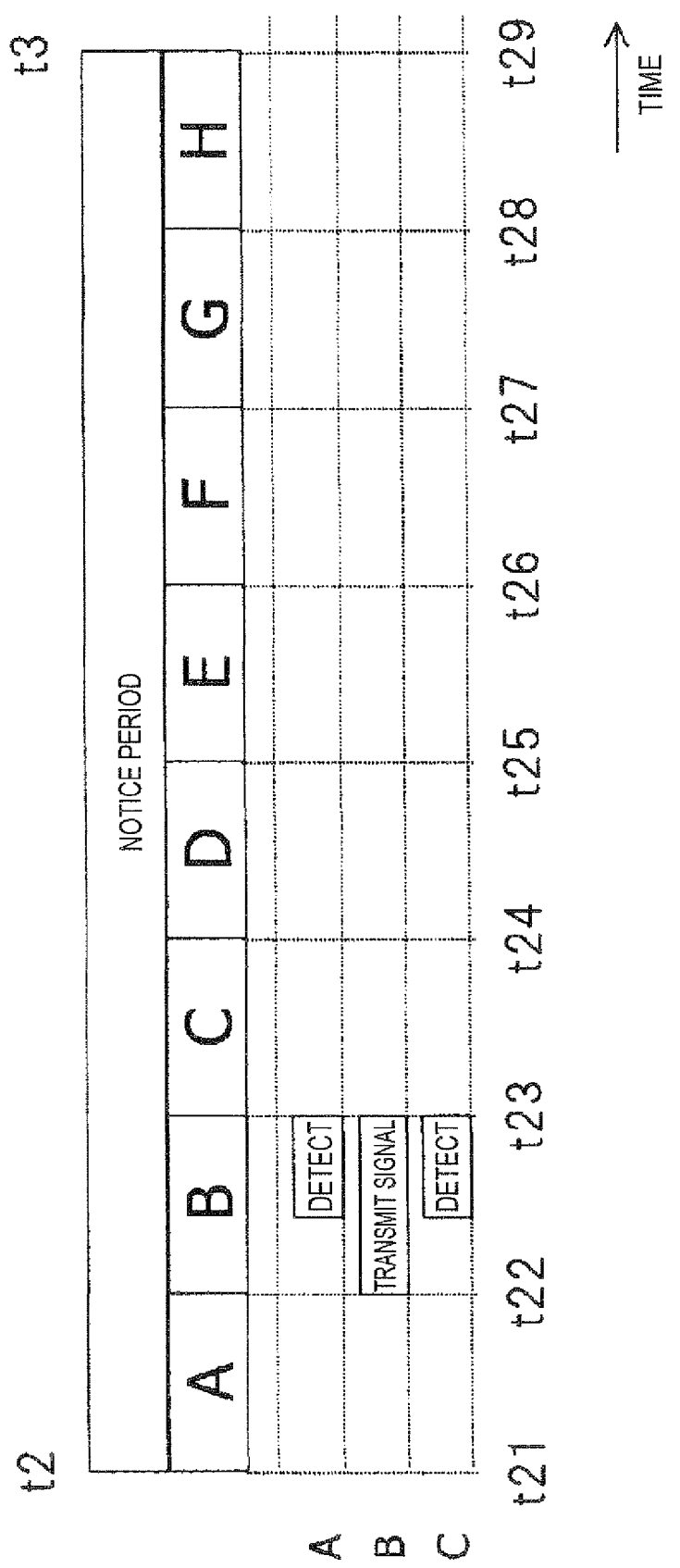
FIG. 9 is a timing chart illustrating an example of an operation of a plurality of communication apparatuses.

On the other hand, the notice period in the control period is divided into a plurality of equally spaced parts, for example 8 parts or 16 parts. Each of the equally spaced parts constitutes a notice slot. Therefore, each notice period has 8 or 16 notice slot therein. In FIG. 9, the notice period from t2 to t3 is divided into 8 notice slots. It is assumed here there are 8 different types of communication methods A, B, C, D, E, F, G, and H, each of which has a different protocol, a different modulation method, and/or a different symbol rate. The notice slot from t21 to t22 allots to the communication method A, the notice slot from t22 to t23 allots to the communication method B, the notice slot from t23 to t24 allots to the communication method C, the notice slot from t24 to t25 allots to the communication method D, the notice slot from t25 to t26 allots to the communication method E, the notice slot from t26 to t27 allots to the communication method F, the notice slot from t27 to t28 allots to the communication method G, and the notice slot from t28 to t29 allots to the communication method H. In practice, these different communication methods can be distinguished from manufacturers of the communication apparatuses 100 or the data communication circuits 110.

The communication controller 120 in the communication apparatus 100 that acquires the transmitting right in the CSMA/CA period in one of the control period transmits the coexist signal to the transmission line 200 at a timing of its slot allotted to its communication method in the notice period in the same control period. In addition, each of the communication controllers 120 in each of communication apparatuses 100 monitors conditions of all slots in the notice period, and confirms whether each of the other communication apparatuses 100 transmits the coexist signal.

In this example shown in FIG. 9, because the communication apparatus 100B that uses the communication method B acquires the transmitting right, the communication apparatus 100B transmits the coexist signal at the timing of the notice slot from t22 to t23. The other communication apparatuses, for example, 100A, 100C, 100D, 100E, 100F, 100G, and 100H, which belong to communication methods A, C, D, E, F, G and H, respectively, recognize that the communication apparatus 100B that uses the communication method B acquires the transmitting right by monitoring the notice slot from t22 to t23.

Generally speaking, there is a possibility to collide a plurality of signals with each other if only the CSMA/CA is performed to control a plurality of the communication apparatuses 100. In this case, a plurality of the communication apparatuses 100, each of which has a different communication method, may acquire the transmitting right in a same CSMA/CA period. The communication apparatuses 100 that acquire the transmitting right transmit a plurality of the coexist signals therefrom to a plurality of the notice slots in a same notice period. This means that a plurality of signals will come into collision to each other in the next control period. Therefore, the collision should be avoided. Here, all of the communication apparatuses 100 that acquire the transmitting right monitor all notice slots. When the communication apparatuses 100 that acquire the transmitting right detect other coexist signal/signals in the same notice period, that is to say, each of the communication apparatuses 100 that acquire the transmitting right finds the coexist signal/signals in other notice slot/slots, the communication apparatuses 100 that acquire the transmitting right renounce the transmitting right for the next period to avoid the collision, as explained in detail in the example below. In this case, none of communication apparatuses 100 transmits data signal in the next data signal frequency band in the next control period.

When the other communication apparatuses 100 that acquire the transmitting right renounce the transmitting right under the same situation mentioned before, a communication apparatus 100 that acquired the last transmitting right in the last control period will successively acquire the transmitting right. In practice, in a case that the communication apparatus 100 that acquired the transmitting right in the last control period has data signals in the next control period, the communication apparatus 100 that acquired the transmitting right in the last control period monitors the notice period of next control period. When the communication apparatus 100 detects that at least two of other communication apparatuses 100 send the coexist signal, the communication apparatus 100 that acquired the transmitting right in the last control period will regard itself as the communication apparatus 100 that acquires the transmitting right in the next control period, and will occupy the data signal frequency band 13 in the next control period.

An operation above-mentioned will be described, referring to FIG. 2.

In FIG. 2, as a result of a CSMA/CA control in a control period T1, a communication apparatus 100A that uses a communication method A acquires the transmitting right of a control period T2 next to the control period T1. Further, as a result of the CSMA/CA control in the control period T2, a communication apparatus 100B that uses a communication method B acquires the transmitting right of a control period T3 next to the control period T2.

In addition, as a result of the CSMA/CA control in the control period T3, both the communication apparatus 100B and a communication apparatus 100C that uses a communication method C may acquire the transmitting right of a control period T4 next to the control period T3. Then, however, both the communication apparatus 100B and the communication apparatus 100C recognize by monitoring the other slots in the same notice period that signals from both communication apparatuses 100B and 100C will collide if each of communication apparatus 100A and 100C continue to get into communication. Therefore, both communication apparatus 100B and 100C renounce the transmitting right of a control period T4. After both communication apparatuses 100B and 100C renounce the transmission right, the communication apparatus B that acquired the latest transmitting right successively acquires the transmitting right of the data signal frequency band 13 in the control period T4.

Furthermore, as a result of CSMA/CA control and monitoring the notice period in a control period, when the communication apparatus 100 that acquired the latest transmitting right recognizes that no communication apparatuses 100 acquire the next transmitting right, the communication apparatus 100 that acquired the latest transmitting right successively acquires the next transmitting right. In other words, the communication controller 120 of the communication apparatus 100 that acquired the latest transmitting right monitors whether or not the control signal is produced in each of the slots assigned to each of the communication methods. When the communication controller 120 of the communication apparatus 100 that acquired the latest transmitting right finds no produced signals in each slot during monitoring, the communication controller 120 acquires the next transmitting right. This configuration makes it possible to efficiently use the frequency band because one of communication apparatuses 100 will always get the transmitting right.

As an alternative of the above-mentioned embodiment example, it may also be possible to control that none of the communication apparatuses 100 transmits data signal in the next data signal frequency band in the next control period.

Next, an operation in a condition that there is at least one hidden terminal that is hidden from other terminals will be described. Generally, there is a possibility that one or some of the communication apparatuses 100 is/are hidden from other communication apparatuses 100 in an environment that a plurality of communication apparatuses 100 coexist on the transmission line 200. That is to say, in a case that the transmission line 200 like a power line is used, communication conditions of communication apparatuses 100, each of which connects to the transmission line 200, dynamically fluctuates in response to line connection status and/or operation status of a variety of electric devices. The fluctuation of the communication conditions may cause the attenuation of signals or a high noise level. Therefore, sometimes at least one of communication apparatuses 100 connected to the same transmission line 200 may not be observed by the other communication apparatuses 100.

Figure 10:
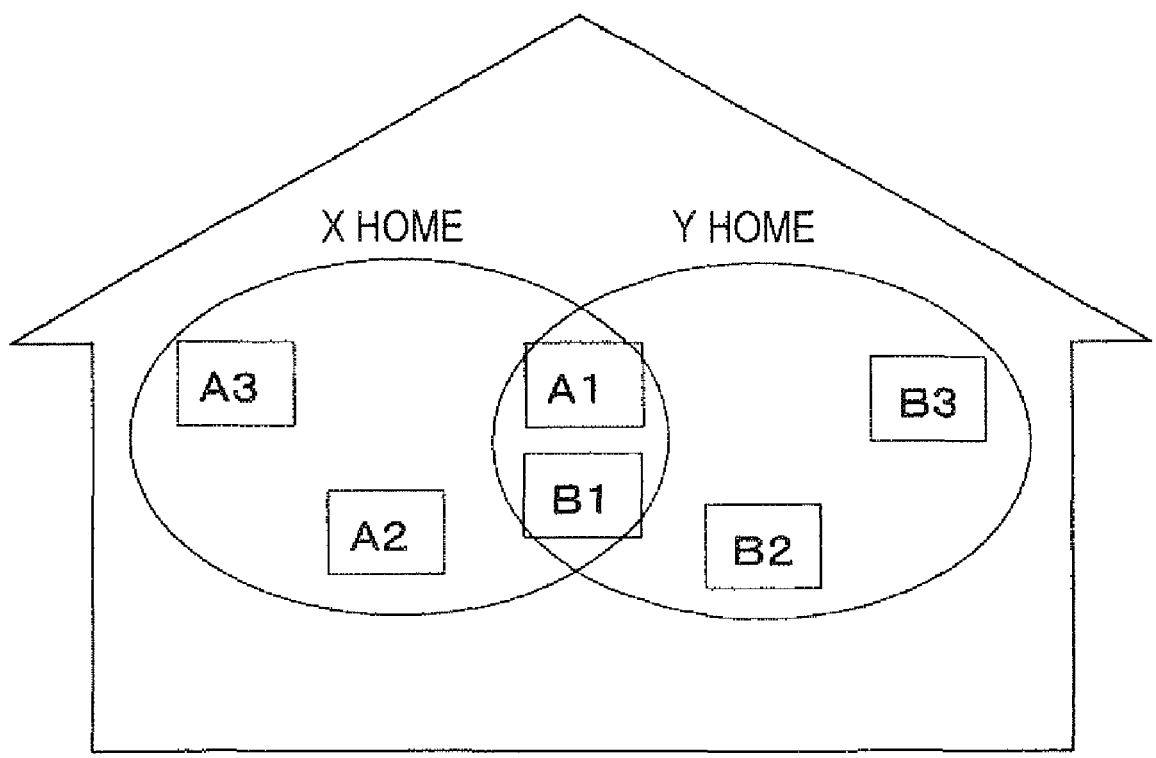
FIG. 10 is a block diagram illustrating an example of a system connected a plurality of communication apparatuses to a common transmission line in an apartment complex.

In an example shown in FIG. 10, it is supposed that both the home of Mr. X and the home of Mr. Y are in a same housing complex, and communication systems in the X's home and the Y's home, which are different from each other, share the transmission line 200 (not shown in FIG. 10) in common. In FIG. 10, the left oval shows the X's home, and the right oval shows the Y's home. There are a same kind of three communication apparatuses A1, A2, and A3 in the X's home, and there are a same kind of three communication apparatuses B1, B2, and B3 in the Y's home. Therefore, all of the communication apparatuses A1, A2, A3, B1, B2, and B3 connect to the transmission line 200 in common.

Moreover, in the example shown in FIG. 10, the communication apparatuses A1, A2, and A3 can communicate with each other, and the communication apparatuses B1, B2, and B3 can communicate with each other. However, because of many reasons such as communication distance between both homes and degradation of frequency characteristic caused by connections of many communication apparatuses to the transmission line 200, the communication apparatus A1 can be observed by all of the communication apparatuses B1, B2, and B3, and the communication apparatus B1 can be observed by all of the communication apparatuses A1, A2, and A3; however, the other combinations among communication apparatuses A1, A2, A3, B1, B2, and B3 can not observe each other.

Therefore, in the environment shown in FIG. 10, when either the communication apparatus A1 or B1 acquires the transmitting right, then there is no problem with communication because all of the communication apparatuses can observe the communication apparatuses A1 and B1. However, for example, when the communication apparatus B2 acquires the transmitting right, the communication apparatuses A2 and A3 do not recognize that communication apparatus B2 connects on the transmission line 200 because coexistence signal transmitted from the communication apparatus B2 in a notice period may not be observed by the communication apparatuses A2 and A3, and either the communication apparatus A2 or A3 also acquires the transmitting right in the next control period in spite of the fact that the communication apparatus B2 acquires the transmitting right. Therefore, signals from the communication apparatus B2 collide with signals from either the communication apparatuses A2 or A3. A control to avoid the collision due to the hidden terminal will be described hereinafter.

Figure 11:
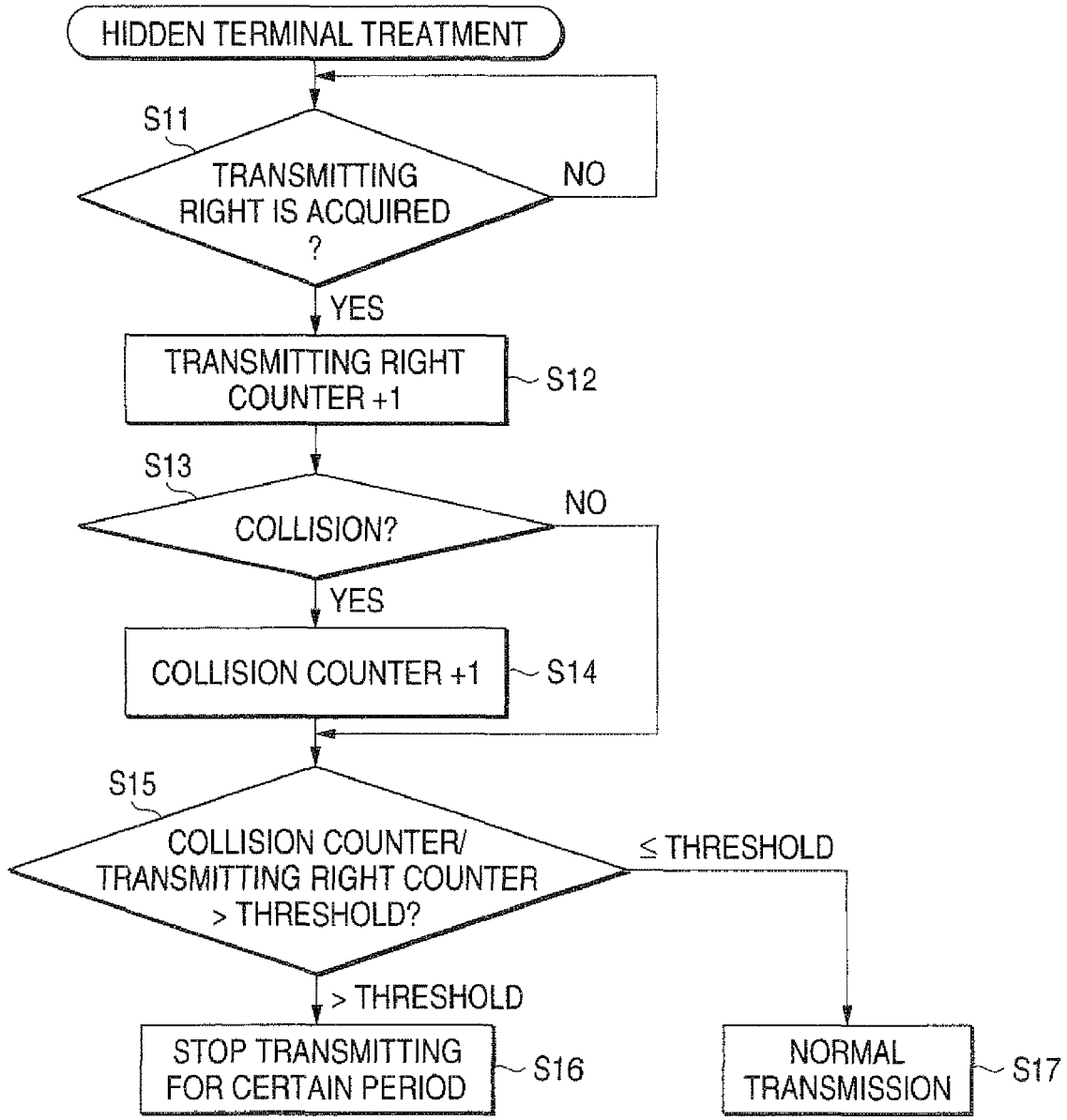
FIG. 11 is a flow chart illustrating an example of an operation for resolving a hidden apparatus problem.

In the control shown in FIG. 11 to avoid the collision due to the hidden terminal, each of the communication controllers 120 independently monitors frequency of collision of a plurality of signals. When the frequency is high, each of the communication controllers 120 regards as being at least one hidden terminal on the transmission line 200, and performs a specific control to deal with the existence of the hidden terminal(s). Specifically, as an example, each step of the apparatus A1 in FIG. 11 will be explained hereinafter.

In step "S11", the communication controller 120 in the communication apparatus A1 identifies whether or not the communication apparatus A1 acquires the transmitting right of the data signal frequency band in next control period. When the communication apparatus A1 identifies to acquire the transmitting right in the S11, then the communication controller 120 goes through the following step "S12" to add "1" to a value of a transmitting right counter (the number of acquiring the transmitting right).

In the next step "S13", the communication controller 120 identifies whether a plurality of the communication apparatuses A1, A2, A3, and B1 (B2 and B3 are hidden from A1) transmit coexistence signals in a plurality of slots in the same notice period, that is, whether a plurality of coexistence signals are outputted in overlapping conditions in the same notice period. When the communication controller 120 identifies the coexistence signals in a plurality of slots, the communication controller 120 regards the conditions as occurring the collision, proceeds to the following step "S14", and adds "1" to a value of a collision counter (the number of occurring the collision).

In the next step "S15", the communication controller 120 calculates collision frequency (the value of the collision counter/the value of the transmitting right counter), and makes a comparison between the collision frequency and a predetermined threshold (for example, 0.9). The collision frequency tends to be relatively low when no hidden communication apparatus exists on the transmission line 200. On the other hand, the frequency of the collision tends to be relatively high when at least one hidden communication apparatus exists on the transmission line 200.

As a result of the comparison, when the collision frequency is lower than the threshold, the communication controller 120 regards this condition as indicative of no hidden communication apparatus on the transmission line 200, proceeds to a step "S17", and gets into normal transmission. Meanwhile, as a result of the comparison, when the collision frequency is higher than the threshold, the communication controller 120 regards this conditions as indicative of at least one hidden communication apparatus on the transmission line 200, proceeds to a step "S16", and stops transmitting signals for a certain amount of time period (the so-called back-off time period). Specifically, the communication controller 120 stops transmitting a coexistence signal in the CSMA/CA period for a predetermined time period (e.g., 1 to 10 seconds). This control makes it possible to suppress occurrences of the collision in case that at least one hidden communication apparatus is on the transmission line 200.

Furthermore, in step S17, the back-off time period for which the communication apparatus A1 stops transmitting signals is not necessary to be a constant, but may be changeable. For example, a back-off time period of a communication apparatus in which the collision frequency is higher than the threshold may be set longer than those of the other communication apparatuses. That is, if a default back-off time of a communication apparatus, whose collision frequency exceeds the threshold, is the same as a default back-off time of other communication apparatuses, the back-off time of the communication apparatus, whose collision frequency exceeds the threshold, may change to a longer back-off time. For example, if the default back-off time is set at 1 second, the back-off time of the communication apparatus, whose collision frequency exceeds the threshold, may change to 2 seconds, as one example. Furthermore, the communication controller 120 can return the back-off time period to the original period when predetermined conditions, for example, after a lapse of a predetermined time and at the time when the collision frequency becomes lower than the threshold or other value, is met. For example, the back-off time may change from 2 seconds to 1 second.

Figure 12:
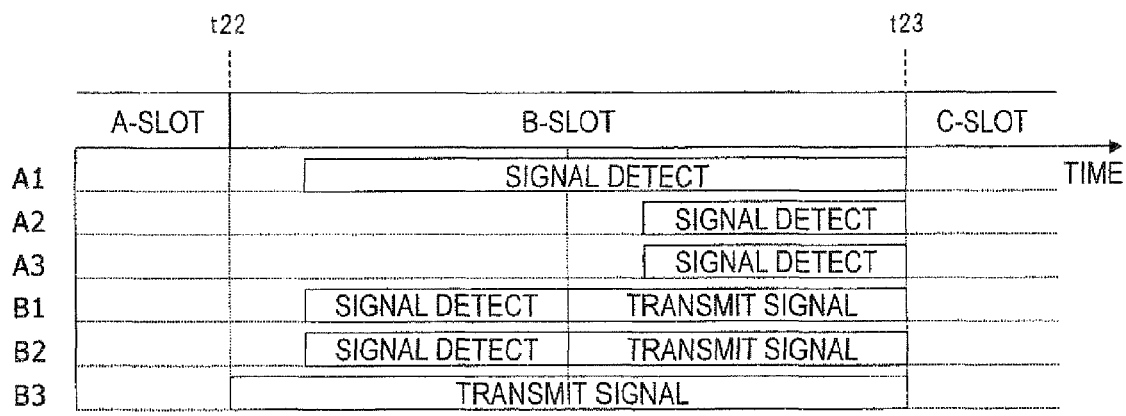
FIG. 12 is a timing chart illustrating an example of an operation of a plurality of communication apparatuses.

Another control shown in FIG. 12 also provides a measure to deal with the hidden terminal problem. In addition, it is possible to perform the control shown in FIG. 11 and another control shown in FIG. 12 simultaneously, and it is also possible to perform either the control shown in FIG. 11 or another control shown in FIG. 12.

The communication apparatuses A1, A2, and A3 belong to the same communication system A. When the communication apparatus A1 identifies in a slot in the notice period that one of the communication apparatuses A2 and A3, in other words, a communication apparatus Ax belonging to the same communication system A, acquires the transmitting right, the communication apparatus A1 transmits the coexistence signal to the transmission line 200 using the same slot as the communication apparatus Ax.

In an example shown in FIG. 12, it is assumed that the communication apparatus B3 acquires the transmitting right in the same environment shown in FIG. 10. Therefore, the communication apparatus B3 transmits the coexistence signal to the transmission line 200 using B-slots that is the time period from t22 to t23 assigned to the communication system B in the notice period. As explained previously referring to FIG. 10, the coexistence signal transmitted from the communication apparatus B3 is detected by the communication apparatuses B1, B2, and A1 because the communication apparatus B3 is visible from the communication apparatus B1, B2, and A1.

In this case, both the communication apparatuses B1 and B2 transmit the coexistence signals to the transmission line 200 when both the communication apparatuses B1 and B2 detect the coexistence signal transmitted from the communication apparatus B3. Specifically, in response to detecting the coexistence signal from the communication apparatus B3 in the first half of the B-slot, both the communication apparatuses B1 and B2 also transmit the coexistence signals to the transmission line 200 in the last half of the B-slot. Consequently, the coexistence signal in the last half of the B-slot transmitted from B1 is detected by the communication apparatus A2, and A3. Therefore, even in a situation that the communication apparatus B3 is hidden from the communication apparatuses A2 and A3, the communication apparatuses A2 and A3 can identify that one communication apparatus belonging to another communication system B acquires the transmitting right. This control makes it possible to prevent the communication apparatuses belonging to either of two communication systems from suffering a collision.

Next, another control will be described. For example, when a terminal such as a personal computer accesses to a network like the Internet, it is usual to connect the terminal to a provider using a transmission line like metal line or an optical fiber line. Furthermore, it is also possible to connect between users and the provider using a power line that supplies a commercial power source. Here, a communication method using the power line in a user's home is called an "in-home-system communication method" (hereinafter "in-home-system"). Each of the other communication methods is called an "access-system communication method" (hereinafter "access-system"). Specifically, the access-system includes communication system using a power line connecting between a power pole and each home, or a power line in an office or a factory.

In the case of connecting between users and the provider using a power line, both at least one communication apparatus of the in-home-system and at least one communication apparatus of the access-system connect to the common power line connect to the common power line. Therefore, a collision between signals from the access-system and signals from the in-home-system should be also avoided in this case. In addition, regarding the access-system, it is usual that there is only one kind of access-system communication method on a power line if several kinds of communication apparatuses, which are made by different makers, do not connect to the power line. However, it is also possible that, for example, a communication system provided by a communication company and another communication system provided by an electric power company share one power line, that is, there may be a plurality of the access-systems on the same power line.

Figure 13:
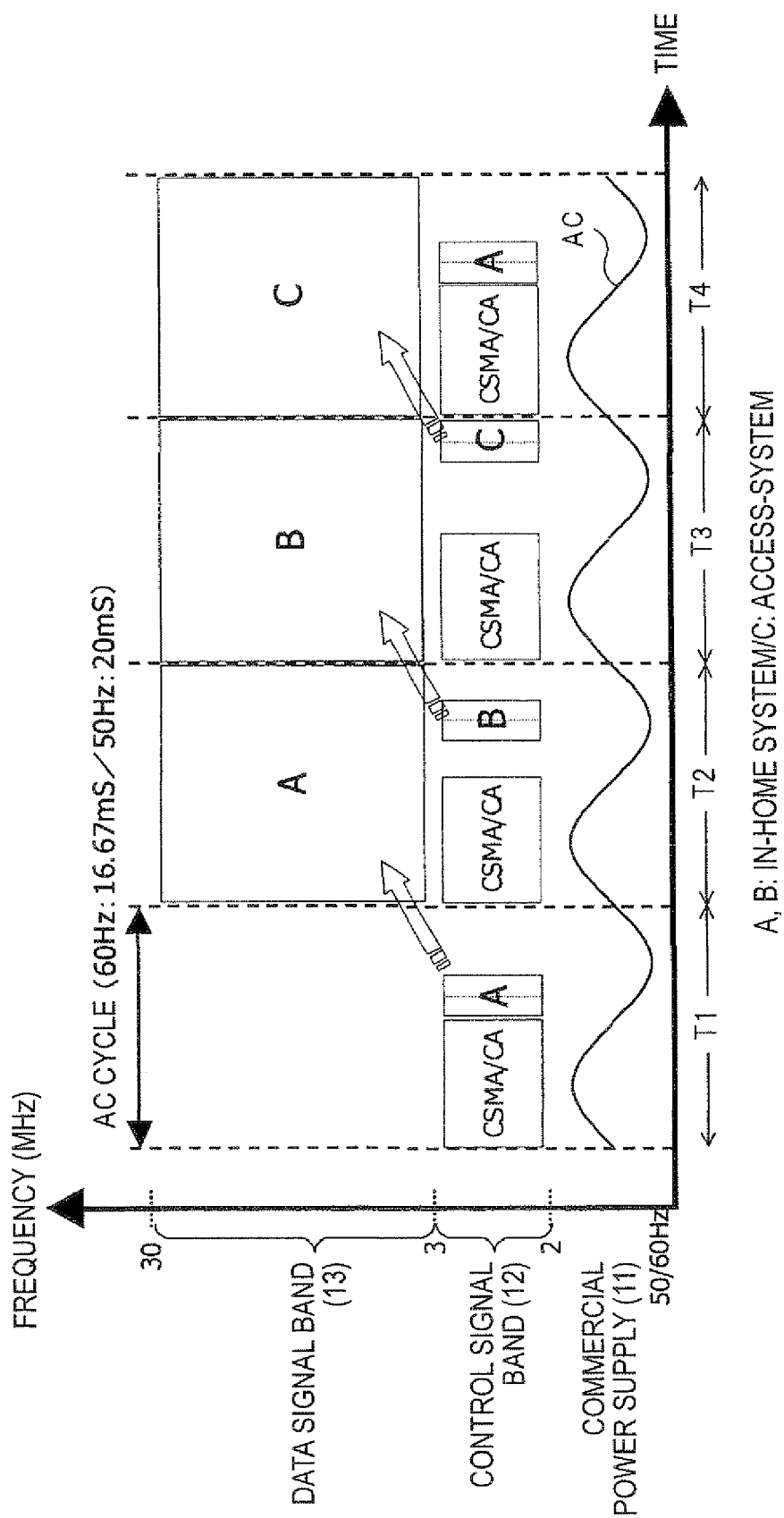
FIG. 13 is a timing chart illustrating an example of an operation of a plurality of communication apparatuses.

In the above-mentioned cases, basically it is possible to prevent a collision between a plurality kinds of signals by using the afore-mentioned communication apparatus 100 in the in-home-system. In an example shown in FIG. 13, communication systems A and B show different kinds of in-home-system communication apparatuses 100A and 100B, respectively. A communication system C shows an access-system communication apparatus 100C.

In this example, time slots in the notice period mentioned previously, each of which is independent of each other, are assigned to the communication systems A, B, and C. Therefore, each of the communication systems A, B, and C can ensure a frequency band (data signal frequency band 13) by performing CSMA/CA control under equal conditions.

In this example, by performing a CSMA/CA control in a CSMA/CA period in a control period T1, the communication system A, which is an in-home-system, acquires a transmitting right for the data signal frequency band 13 in a control period T2 next to the control period T1. By performing a CSMA/CA control in a control period T2, the communication system B acquires a transmitting right for the data signal frequency band 13 in a control period T3. By performing a CSMA/CA control in a control period T3, the communication system C, which is an access-system, acquires a transmitting right for the data signal frequency band 13 in a control period T4.

All of the communication systems including both access-systems and in-home-systems are assigned different identification data, respectively. The control for acquiring the transmitting right is performed based on the identification data. Therefore, this makes it possible to avoid a collision between signals from the in-home-system and signals from the access-system. In addition, it may be possible to assign only one identification data to the entire access-system communication system, or it is also possible to assign different identification data to each access-system communication system. Assigning different identification data to each access-system communication system allows a plurality of access-system communication systems to coexist on a same transmission line. In addition, a coexistence signal comprises the identification data in this example.

Figure 14:
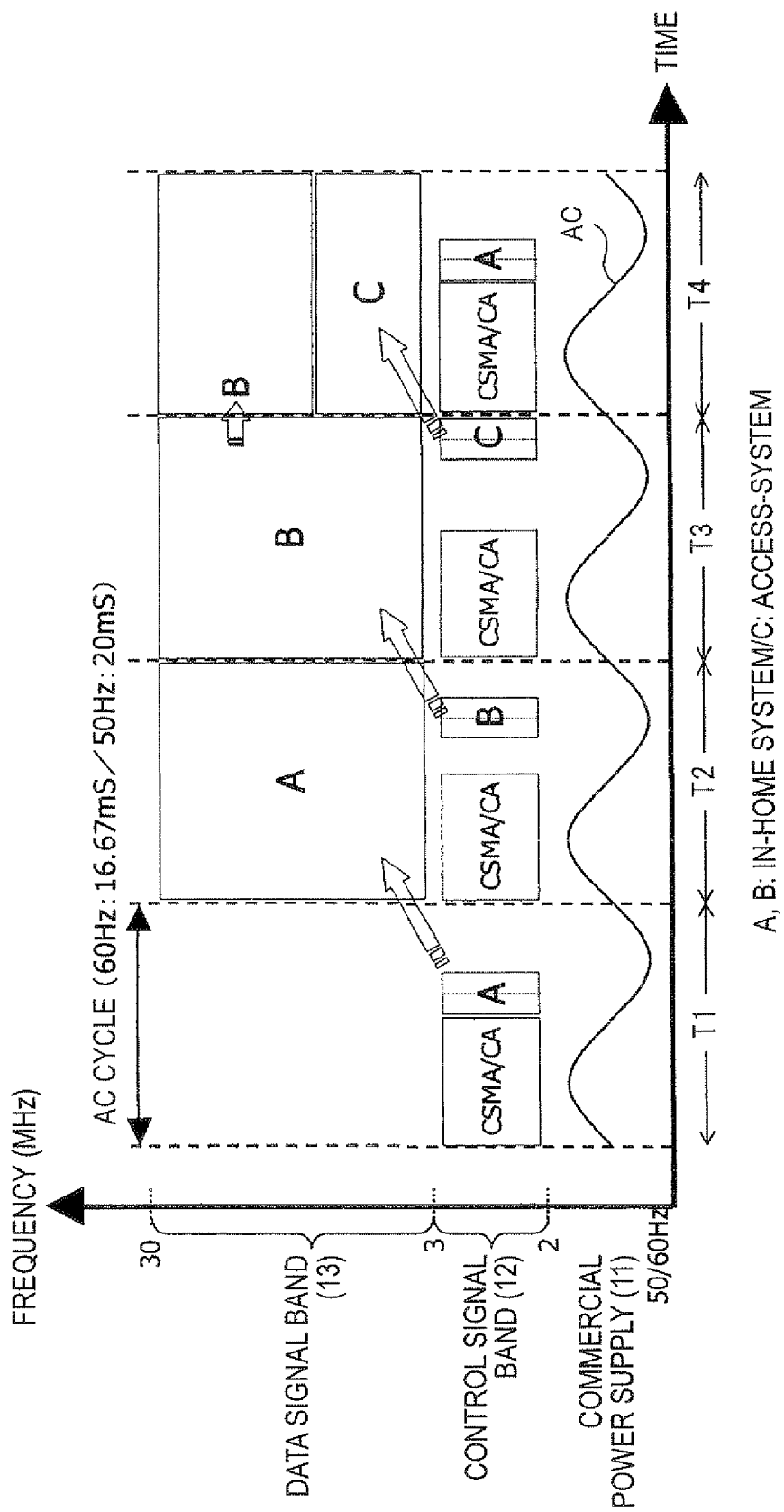
FIG. 14 is a timing chart illustrating an example of an operation of a plurality of communication apparatuses.

A modified example will be described with reference to FIG. 14. The longer length of a transmission line that is used for actual communication, the more the high frequency signal component greatly attenuates in the access-system. Therefore, transmission speed in the access-system may not improve even if the frequency band used in the access-system broadens. In that case, for example as shown in FIG. 14, it is preferable to divide the data signal frequency band 13 into a lower portion (for example, 3 MHz to 10 MHz) and a higher portion (for example, 10 MHz to 30 MHz) and to assign the lower portion to the access-system. Efficiency of the use of frequency thus may be improved.

In the example shown in FIG. 14, by performing a CSMA/CA control in a CSMA/CA period in a control period T3, the communication system C acquires a transmitting right for the lower portion in the data signal frequency band 13 in a control period T4 next to the control period T3. The communication system B, which acquired the transmitting right in the last control period T3, again acquires a transmitting right for the higher portion, which is not used by the communication system C, in the data signal frequency band 13 in a control period T4.

In this case, the communication apparatus 100B of the communication system B monitors a notice slot allotted to the communication system C in the notice period, in other words, the communication apparatus 100B detects the identification data of the communication system C. Thus, the communication apparatus 100C recognizes whether the communication system C acquires a transmitting right. If the communication apparatus 100B recognizes that the communication apparatus 100C acquires the transmitting right to the control period T4, the communication apparatus 100B is operable to keep a transmitting right for only the higher portion in the control period T4.

Another modified embodiment example will be described with reference to FIG. 15. In the embodiment example shown in FIG. 15, the communication system C does not perform the CSMA/CA control. Instead, the communication system C will acquire a transmitting right for exclusively using the lower portion in the data signal frequency band 13 as needed. The communication system C will notice in the notice slot in the notice period that the communication system C, which is an access-system, acquired the transmitting right.

Figure 15:
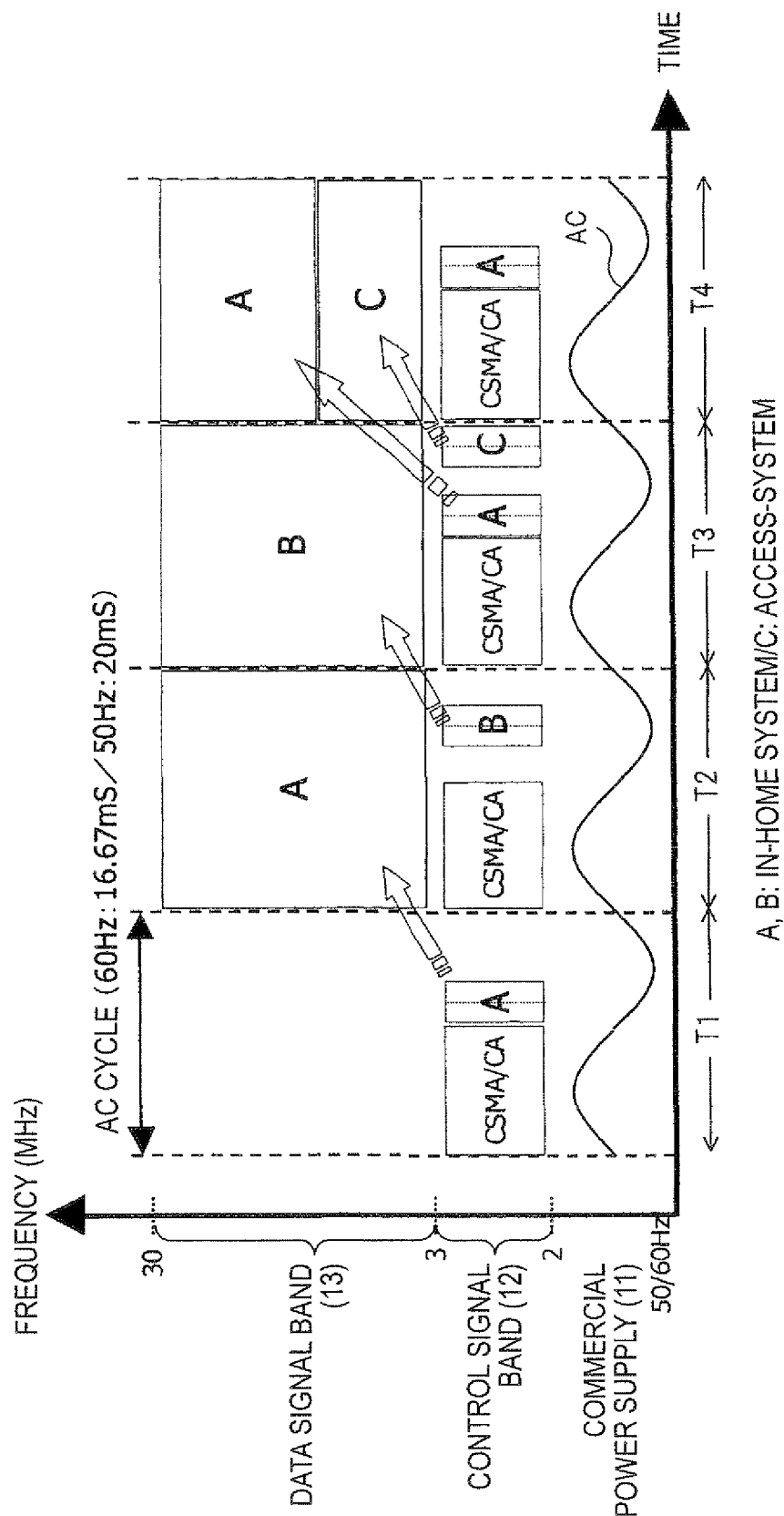
FIG. 15 is a timing chart illustrating an example of an operation of a plurality of communication apparatuses.

In this example shown in FIG. 15, it is assumed that no collision occurs between an access-system and an in-home-system. Therefore, although each of the in-home-system A and the access-system C sends a coexistence signal, which represents acquisition of a transmitting right, in a same notice period, this is not a collision, and actually, both the communication system A and the communication system C acquire the transmitting right in the next control period T4.

In this case, the communication apparatus 100A of the communication system A only uses the higher portion in the data signal frequency band 13 in the next control period T4 if the communication apparatus A detects that the communication system C acquires the transmitting right in the notice period.

In addition, it also may be possible that the communication apparatus 100C of the communication system C acquires the transmitting right regardless of detecting at least one of control signals sent from other communication apparatuses 100A and 100B, and sends a control signal related to the acquisition of the transmitting right in the notice period assigned to the communication apparatus 100C in advance.

Assuming that communication in an apartment is made using a power line, a first user in the apartment may connect the same kinds of communication apparatuses manufactured by a same maker to the power line. However, the more the number of users utilizing power line communication increases, the more different kinds of communication apparatuses may be connected to the power line. In a case that only one kind of communication apparatuses connect to a same power line, the controls mentioned above may not be necessary since no collision between a plurality of signals occurs on the transmission line 200.

Therefore, another control performed in the communication apparatus 100 will be described. Each communication apparatus 100A, for example, counts how many times each communication apparatus 100A or each communication system A, to which each communication apparatus 100A belongs, acquires the transmitting right (hereinafter the "acquisition number"). Then the communication apparatus 100A compares the acquisition number for a predetermined period with a predetermined threshold (for example, 100 times). Or the communication apparatus 100A compares acquisition frequency (the acquisition number/the number of transmitting carrier signals) with a predetermined threshold (for example, 0.99). If the acquisition number or the acquisition frequency is equal to or greater than the threshold, that is, the frequency of acquiring the transmitting right is high, the communication apparatus 100A decides that there is no different kind of communication apparatus 100B or 100C, or communication system B or C in the transmission line 200. In this case, the communication apparatus 100A fixes the condition of the switching circuit 140 to be "on" for a certain period (for example, ten minutes or more), and acquires the transmitting right in all control periods. Furthermore, the communication controller 120 is also operable to stop sending the control signal. Thus, not only aforementioned data signal frequency band 13 but also the control signal frequency band 12 can be utilized for data transmission. Therefore, efficiency of the use of frequency may be improved.

In addition, as an alternative to the abovementioned control mode, it is possible to perform another control mode described below. The communication apparatus 100A counts how many times the other communication apparatuses 100B or 100C, or the other communication system B or C, acquires the transmitting right (hereinafter the "acquisition number of other system"). Then the communication apparatus 100A compares the acquisition number of other system for a predetermined period with a predetermined threshold. If the acquisition number of other system or the acquisition frequency of the other system is equal to or less than the threshold (for example, ten times or 1%), that is, frequency of acquiring the transmitting right by other system is low, the communication apparatus 100A decides that there is no different kind of communication apparatus 100B or 100C or communication system B or C in the transmission line 200.

As time advances, a different kind of communication apparatus 100B or 100C may connect to the transmission line 200. Even if the communication apparatus 100A is under a condition that the communication apparatus 100A decided that there was no different kind of communication apparatus 100B or 100C, or communication system B or C in the transmission line 200, and stopped sending the control signal, the communication apparatus 100A decides that a different kind of communication apparatus 100B or 100C is connected to the transmission line 200 when the acquisition number counted by the communication apparatus 100A is not greater than the threshold. Then, the communication apparatus 100A changes its control mode to, for example, the control mode shown in FIG. 2.

According to these embodiment examples described herein, the communication apparatus controls a communication timing based on a synchronizing signal generated at a specific timing of AC voltage sine-waveform of the commercial power source. Therefore, these examples make it possible to control a variety of timings such as signal transmission, monitoring a timing slot or the like, appropriately. These examples make it possible to prevent signals being a kind of noise from being transmitted to the transmission line by performing such a control that a communication apparatus, which does not acquire a transmitting right, turns off its transmitting function. Therefore, different kinds of signals are prevented from colliding to each other on a power line, and different kinds of communication apparatuses can coexist on a common power line.

In addition, although several embodiment examples are described that all control a transmitting right, transmitting a control signal in the notice period and data transmission are performed based on the right timing of the synchronizing signal SS, transmitting a control signal in the notice period and data transmission may be performed starting at a predetermined time after the SS is outputted. The predetermined time is preferable to be less than a half of the AC period; for example, if the frequency of the AC is 50 Hz, then the predetermined time is less than 8.3 milliseconds, for example 3 milliseconds. In addition, the predetermined time is not necessary to be a constant value among all communication apparatuses. For example, each of different kinds of communication apparatuses employing different kinds of specifications may be set a different predetermined time.

In some cases, it may not be necessary for the communication apparatus to synchronize with the synchronizing signal SS if the communication apparatus utilizes the synchronizing signal SS, in some way. For example, in a case that the synchronizing signal SS comprises a rectangular wave with one pulse synchronizing with one zero crossing point of AC sine waveform, the communication apparatus may control the transmitting right after a specific time based on the one pulse.

Furthermore, if the communication apparatus performs a control of transmitting right via the power line, transmitting a control signal in the notice period and data transmission are not necessary to be performed via the power line. A transmission line for data transmission may be wired or wireless. A variety of cables, such as a LAN cable, a coaxial cable, a telephone line and a speaker line, may be used as the wired transmission line.

In addition, although the above-mentioned embodiment examples show that a data signal and a control signal are independent of each other regarding frequency by dividing frequency band into control signal frequency band and data signal frequency band, it is enough if the data signal and the control signal are independent of each other. For example, the control signal band and the data signal band overlap each other, and the data signal and the control signal are transmitted in a time divisional mode.

Although preferred embodiment examples have been described and disclosed for illustrative purposes, those skilled in the art will appreciate that various modifications, additions, and substitutions of these examples are possible, without departing from the scope and spirit thereof.

This description is based on Japanese Patent Application No. 2005-000163, filed on Jan. 4, 2005, the entire subject matter of which is expressly incorporated by reference herein.

What is claimed is:

1. A communication apparatus, which performs data communication through a power line transmitting alternating current having a predetermined frequency and which employs a first communication method, the communication apparatus comprising:
   a data communication circuit that performs data communication; and
   a controlling circuit that controls the data communication circuit,
   wherein when a signal transmitted from a communication device exists within a notice period but no signal transmitted from the communication apparatus exists within the notice period, the controlling circuit precludes the data communication performed by the data communication circuit while the communication device performs data communication through the power line employing a second communication method different from the first communication method,
   wherein the notice period is synchronized with the predetermined frequency of the alternating current, and
   wherein the communication apparatus and the communication device, employing the first and the second communication methods, respectively, to generate communication signals, are unable to demodulate the communication signals transmitted from one another.

2. The communication apparatus according to claim 1, wherein the alternating current is generated from a commercial power source.

3. The communication apparatus according to claim 1, wherein the predetermined frequency is one of 50 Hz and 60 Hz.

4. The communication apparatus according to claim 1, wherein the notice period is synchronized with a zero crossing point of the alternating current.

5. The communication apparatus according to claim 4, wherein the notice period starts at a certain offset from the zero crossing point of the alternating current.

6. The communication apparatus according to claim 1, wherein the data communication circuit performs the data communication with a MHz frequency band.

7. The communication apparatus according to claim 6, wherein the frequency band includes from 2 MHz to 30 MHz.

8. The communication apparatus according to claim 1, wherein the signal transmitted from the communication device is a preamble.

9. The communication apparatus according to claim 1 further comprising:
a switching circuit that switches the data communication performed by the data communication circuit,
wherein the controlling circuit controls the data communication circuit through the switching circuit.

10. The communication apparatus according to claim 1, wherein the data communication circuit performs the data communication based on CSMA/CA (Carrier Sense Multiple Access with Collision Avoidance).

11. The communication apparatus according to claim 1,
wherein the second communication method is different from the first communication method in respect of at least one of communication protocol, modulation method of the signal, symbol rate of the signal.

12. The communication apparatus according to claim 1, wherein the data communication circuit performs the data communication within a communication period, the communication period being different from the notice period.

13. The communication apparatus according to claim 1, wherein the communication device transmits the signal within a first frequency and the data communication circuit performs the data communication within a second frequency, the second frequency being different from the first frequency.

14. The communication apparatus according to claim 13, wherein the second frequency is higher than the first frequency.

15. The communication apparatus according to claim 1, wherein the data communication circuit transmits another signal within the notice period, the notice period includes a first period and a second period, the data communication circuit transmits the another signal within the first period, and the communication device transmits the signal within the second period.

16. The communication apparatus according to claim 1, wherein when no signal transmitted from the communication device exists within the notice period, no signal transmitted from the communication apparatus exists within the notice period and the communication apparatus does not perform the data communication in a last cycle, the controlling circuit precludes the data communication performed by the data communication circuit.

17. A communication apparatus, which performs a data communication through a power line transmitting alternating current having predetermined frequency, and which employs a first communication method, the communication apparatus comprising:
a data communication means for performing data communication; and
a controlling means for controlling the data communication means,
wherein when a signal transmitted from a communication device exists within a notice period but no signal transmitted from the communication apparatus exists within the notice period, the controlling means stops the data communication performed by the data communication means while the communication device performs data communication through the power line employing a second communication method different from the first communication method,
wherein the notice period is synchronized with the predetermined frequency of the alternating current, and
wherein the communication apparatus and the communication device, employing the first and the second communication methods, respectively, to generate communication signals, are unable to demodulate the communication signals transmitted from one another.

18. A communication method, which performs a data communication by a communication apparatus through a power line transmitting alternating current having predetermined frequency, and which uses a first communication method, the communication method comprising:
(a) performing data communication; and
(b) controlling the data communication performed in step (a),
wherein when a signal transmitted from a communication device exists within a notice period but no signal transmitted from the communication apparatus exists within the notice period, the data communication performed in step (a) is stopped in step (b) while the communication device performs data communication through the power line employing a second communication method different from the first communication method,
wherein the notice period is synchronized with the predetermined frequency of the alternating current, and
wherein the communication apparatus and the communication device, employing the first and the second communication methods, respectively, to generate communication signals, are unable to demodulate the communication signals transmitted from one another.

19. A communication apparatus, which is operable on a power line in which a first communication system and a second communication system that is non-interoperable with the first communication system are coexisting, and which employs the first communication system, the communication apparatus comprising:
a transmitter that transmits a first control signal, which controls at least one of a first communication carried out by the communication apparatus and which is for controlling another communication apparatus, which employs the second communication system, to perform no communication, in a first predetermined period synchronized with alternating current on the power line;
a receiver that receives a second control signal transmitted from the another communication apparatus in a second predetermined period which differs from the first predetermined period, and
a communication unit that assigns a communication band to the first communication on the basis of at least one of the first control signal and the second control signal.

20. The communication apparatus according to claim 19 further comprising:

a receiver that receives a second control signal transmitted from the another communication apparatus in the predetermined period, wherein the communication unit is controlled to perform no communication in another predetermined period on the basis of the second control signal.

21. The communication apparatus according to claim 19, wherein the first predetermined period corresponds to the first communication system and the second predetermined period corresponds to the second communications system.

22. The communication apparatus according to claim 21, wherein the first predetermined period and the second predetermined period are is synchronized with the alternating current on the basis of zero cross point of the alternating current.

23. The communication apparatus according to claim 22, wherein the first predetermined period and the second predetermined period are configured on the basis of a cycle of the alternating current.

24. The communication apparatus according to claim 19, wherein the communication unit obtains a bandwidth for use in the first communication on the basis of the first control signal.

* * * * *